(12) United States Patent
Parrish

(10) Patent No.: US 10,660,282 B1
(45) Date of Patent: May 26, 2020

(54) HORTICULTURE APPARATUS AND METHOD

(71) Applicant: Taylor MichaelMason Parrish, Reno, NV (US)

(72) Inventor: Taylor MichaelMason Parrish, Reno, NV (US)

(*) Notice: Subject to any disclaimer, the term of this patent is extended or adjusted under 35 U.S.C. 154(b) by 229 days.

(21) Appl. No.: 15/948,754

(22) Filed: Apr. 9, 2018

Related U.S. Application Data

(60) Provisional application No. 62/483,350, filed on Apr. 8, 2017.

(51) Int. Cl.
| | | |
|---|---|---|
| *A01G 31/04* | (2006.01) | |
| *A01G 9/14* | (2006.01) | |
| *A01G 27/00* | (2006.01) | |
| *A01G 9/08* | (2006.01) | |
| *A01G 9/02* | (2018.01) | |

(52) U.S. Cl.
CPC ............ *A01G 31/04* (2013.01); *A01G 9/022* (2013.01); *A01G 9/085* (2013.01); *A01G 27/001* (2013.01)

(58) Field of Classification Search
CPC .......... A01G 9/08; A01G 9/085; A01G 31/06; A01G 31/04; A01G 9/143
See application file for complete search history.

(56) References Cited

U.S. PATENT DOCUMENTS

| | | | |
|---|---|---|---|
| 4,543,744 A | 10/1985 | Royster | |
| 5,247,761 A * | 9/1993 | Miles | A01G 9/086 |
| | | | 111/104 |
| 5,956,897 A | 9/1999 | Takashima | |
| 6,508,033 B2 * | 1/2003 | Hessel | A01B 79/005 |
| | | | 47/60 |
| 8,533,993 B2 | 9/2013 | Pettibone | |
| 8,671,617 B2 * | 3/2014 | Prohaska | A01G 9/00 |
| | | | 47/62 C |
| 2012/0324788 A1 * | 12/2012 | Sakura | A01G 9/083 |
| | | | 47/66.6 |
| 2016/0270304 A1 * | 9/2016 | Higgins | A01D 93/00 |
| 2017/0064912 A1 | 3/2017 | Tabakman | |
| 2017/0202162 A1 | 7/2017 | Dufresne et al. | |
| 2017/0251589 A1 | 9/2017 | Tippery et al. | |
| 2017/0311560 A1 * | 11/2017 | Agari | A01G 31/04 |
| 2018/0027747 A1 * | 2/2018 | Yoshida | A01G 7/00 |
| 2018/0235156 A1 * | 8/2018 | Blair | A01G 9/18 |
| 2019/0150375 A1 * | 5/2019 | Miyahara | A01G 9/143 |

FOREIGN PATENT DOCUMENTS

| | | |
|---|---|---|
| CN | 106233887 | 12/2016 |
| CN | 206136798 | 5/2017 |
| CN | 106941977 | 7/2017 |
| DE | 102007006675 | 9/2007 |
| EP | 1258186 | 2/2005 |

* cited by examiner

*Primary Examiner* — Monica L Williams
(74) *Attorney, Agent, or Firm* — Fennemore Craig, P.C.

(57) ABSTRACT

A horticulture apparatus and method for planting, growing, and harvesting plants may include a platform having a width axis and a length axis, a gantry sized to straddle and move across at least one of the platform's width and length axes, and a controller. The gantry may comprise a frame, a motor mounted to the frame, a container bin operatively connected to the frame, and a modular tool operatively connected to the frame. The controller may engage the motor of the gantry to move the gantry across the platform, thereby providing the modular tool with access to different locations on the platform.

19 Claims, 14 Drawing Sheets

HORTICULTURE APPARATUS AND METHOD

CROSS-REFERENCE TO RELATED APPLICATION

The present application for patent claims priority through the applicant's prior provisional patent application, entitled, Automated Hydroponic Growing Bed, Automated Hydroponic Growing System, No. 62/483,350, filed Apr. 8, 2017, which provisional application is hereby incorporated by reference in its entirety for all useful purposes. In the event of any inconsistency between the prior patent applications and the instant application (including without limitation any limiting aspects), the instant application shall prevail.

COPYRIGHT NOTICE

This patent document contains material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF DISCLOSURE

The present application relates to the field of horticulture and more particularly to a horticulture apparatus and method for at least one of controlled planting, growth, and harvesting of plants.

BACKGROUND

The global demand for crops and agricultural products, both for food and for medicinal or industry uses, will continue to increase throughout the 21st century. One potential solution to increase output is the use of automated indoor farming techniques to grow crops in smaller areas with higher efficiency. However, such systems are typically expensive to construct and implement, complex, and difficult to scale. Furthermore, they are typically labor intensive and inflexible—a system optimized for a certain plant product may not be capable of growing alternative plant products without significant and expensive reengineering.

BRIEF SUMMARY OF SOME ASPECTS OF THE PRESENT APPARATUS AND METHOD

The applicant believes that he has discovered at least one or more of the problems and issues with prior art horticulture apparatus and methods as well as one or more advantages provided by differing embodiments of the system disclosed in this specification. In one aspect, the applicant believes that he has discovered a novel apparatus and method for planting, growing, and harvesting plants that can include a platform having a width axis and a length axis, a slidably movable gantry sized to straddle and move across at least one of the platform's width and length axes, and a controller. In some implementations, the gantry includes one or more of a frame, a motor mounted to the frame, a container bin operatively connected to the frame, and a modular tool operatively connected to the frame. The controller may engage the motor of the gantry, moving the gantry across the platform in one or more directions, thereby providing the modular tool with access to multiple locations on the platform.

In some embodiments, the horticulture apparatus and method includes a platform rack containing a plurality of platforms arranged in a structured configuration, such as a vertical configuration, a slidably movable gantry sized to straddle and move across at least one of the platforms' width and length axes, a controller, and a gantry elevator aligned with said platforms and configured to receive the gantry. One or more platforms included in a platform rack may have a standardized width axis, length axis, or both, and may support a substrate suitable for growing one or more plant products. In some embodiments, the gantry includes a frame, a motor mounted to the frame, a seeding tool mounted to the frame, a seeding bin mounted to the frame and coupled to the seeding tool, a cutting tool mounted to the frame, and a transport bin mounted to the frame and oriented in a relation to the cutting tool. In some implementations, the controller, at a first time interval, engages the motor, moving the gantry at least partially across a first platform while engaging the seeding tool to draw plant seeds from the seeding bin, distribute the seeds on the substrate of the first platform, or both. In some instances, the controller engages the motor to move the gantry to the gantry elevator, engages the gantry elevator to align the gantry with a second platform of the platform rack, or both. In certain implementations, the controller engages the motor to move the gantry across the second platform while engaging the seeding tool to draw plant seeds from the seeding bin, distribute the seeds on the substrate of the second platform, or both.

In some embodiments, the controller, at a second time interval, engages the motor to move the gantry across the second platform while engaging the cutting tool to cut one or more plants, such as for example, mature plants that have grown in the platform substrate, moving harvested plant matter into the transport bin, or both. In some implementations, the controller engages the motor to move the gantry to the gantry elevator, engages the gantry elevator to align the gantry with the first platform of the platform rack, or both. The controller, in some instances, engages the motor to move the gantry across the first platform while engaging the cutting tool to cut one or more plants, such as for example, mature plants that have grown in the platform substrate, moving harvested plant matter into the transport bin, or both.

Also disclosed is a method of growing and harvesting plants using a horticulture apparatus including a platform, a slidably movable gantry sized to straddle and move across the platform, and a plant growth sensor, the method including providing a substrate on the platform suitable for growing a plant product; connecting the gantry, at a first time interval, to a seeding tool; moving the gantry across the platform, the seeding tool distributing seeds onto said platform substrate; releasing the gantry from the seeding tool; monitoring the growth of the plant product using, at least in part, the plant sensor; connecting the gantry, at a second time interval, to a harvesting tool and a harvesting bin; and moving the gantry across the platform, said harvesting tool collecting grown plant product from the platform substrate and placing it in the harvesting bin.

The horticulture apparatus and method to plant, grow, and harvest plants have several advantages over traditional approaches. By utilizing the three-dimensional platform stacking ability of the system array, a very high quantity of square footage can be devoted to growing plants in a relatively small space. The horticulture apparatus and method can be housed in a sealed building in a climate controlled environment, potentially excluding pests and parasitic plant organisms and thereby reducing or eliminating the use of pesticides and herbicides applied to the plants grown by the horticulture apparatus and method. The gantry which seeds and harvests plants is modular in nature and may be outfitted with a variety of seeding and harvesting tools best suited to the unique needs of the particular plant species being grown. The gantry accomplishes this flexibility using an efficient, streamlined design which requires relatively few moving parts and enables a high degree of uptime and reliability, as well as ease of maintenance when system components do need to be replaced. Finally, because in some embodiments, the system potentially requires only one gantry to service the platforms regardless of the number of racks 56 or arrays 64 installed, the system can be scaled efficiently and inexpensively to accommodate additional platforms and increase production capacity. In part or in total, these advantages contribute to an overall benefit of reducing the labor required for plant production.

It is to be understood that this Brief Summary of Some Aspects of the Present Apparatus and Methods recites only some aspects of the present disclosure. There are other novel and advantageous aspects, that will become apparent as this specification proceeds. The scope of the disclosure is to be determined by the claims as issued and not by whether the subject matter addresses an issue identified in the Background section above or includes or provides a feature set forth in this Brief Summary.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by one or more apostrophes that distinguishes among the similar components. If only the reference label is used in the specification without any apostrophes, the description is applicable to any one of the similar components having the same first reference label irrespective of the presence or absence of apostrophes.

DETAILED DESCRIPTION OF SOME EMBODIMENTS

The prior Brief Summary and the following Detailed Description provide examples that are not limiting of the scope of this specification. One skilled in the art would recognize that changes can be made in the function and arrangement of elements discussed without departing from the spirit and scope of the disclosure. Various embodiments can omit, substitute, add, or mix and match various procedures or components as desired. For instance, the methods disclosed can be performed in an order different from that described, and various steps can be added, omitted, or combined. Also, features disclosed with respect to certain embodiments can be combined in or with other embodiments as well as features of other embodiments.

The teachings of the present invention describe various embodiments and elements of an apparatus and method for automatically planting, growing, and harvesting plants and non-plant organic items such as, for example, fungi. For the purposes of this specification and the accompanying claims, the term "plants" shall refer to all crops, other plant species, and non-plant organic items such as fungi, which may be grown in various substrate, such as, for example, soil, hydroponic aquaculture, and the like.

Figure 1:
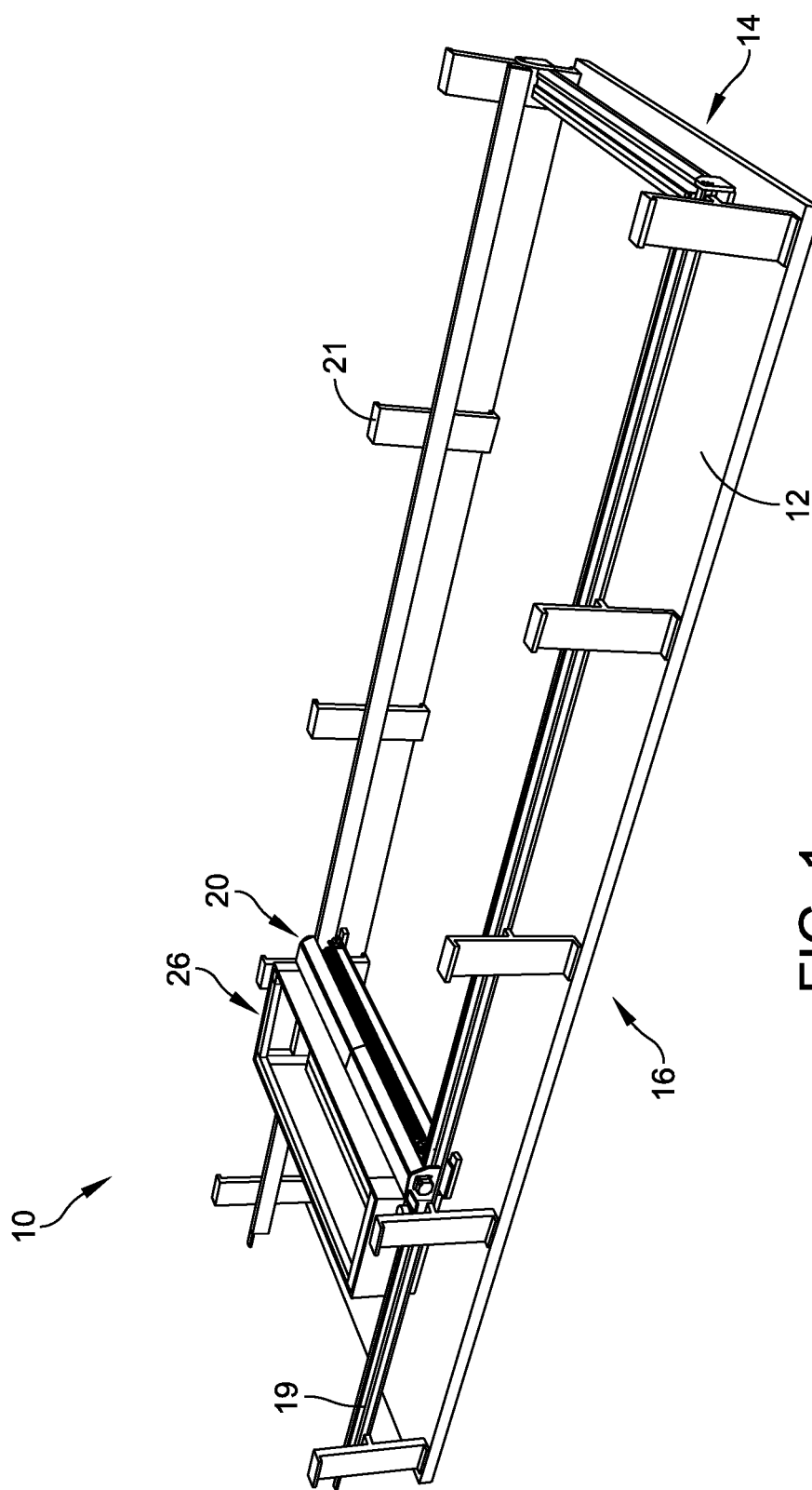
FIG. 1 is a perspective view of a horticulture apparatus to plant, grow, and harvest plants.

Referring now to FIG. 1, in some embodiments, a horticulture apparatus 10 includes a platform 12 having a width axis 14 and a length axis 16. The platform 12 includes a planar support surface 18 for supporting plant growth substrate which can provide at least a part of a suitable plant growth environment, such as a nutrient containing environment. A series of posts 21 are aligned along the length axis 16 of each side of the planar support surface and mounted to the planar support surface 18. Raised tracks 19 are positioned along the length axis 16 of each side of the planar support surface 18 and coupled to at least one of the posts 21 on the corresponding side of the planar support surface. A gantry 20 is slidably movable along at least a portion of the length of the raised tracks 19. In some instances, a container bin 26 is coupled to the gantry 20 such that it is slidably movable consistent with the movement of the gantry 20.

Figure 2:
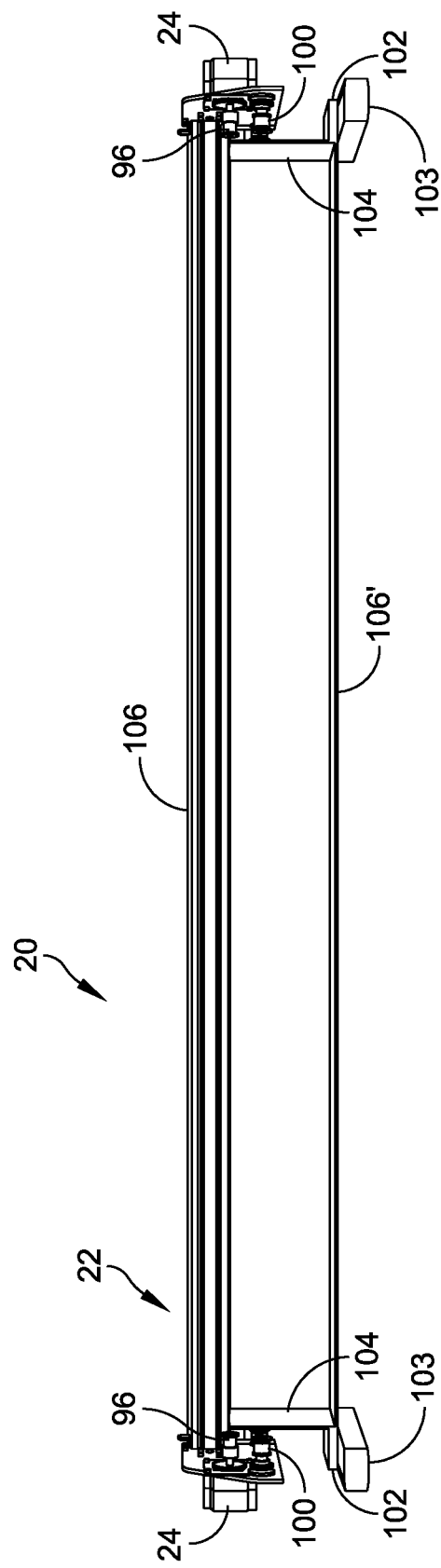
FIG. 2 is a perspective view of a gantry frame.

Referring now to FIG. 2, a gantry 20 is sized to straddle and move across at least one of the axes 14, 16 of the platform 12. The gantry 20 can include a frame 22 which straddles the platform 12. In some embodiments, a motor 24 is mounted to the frame 22, which when activated moves the gantry 20 across at least one of the axes 14, 16 of the platform 12.

Figure 4:
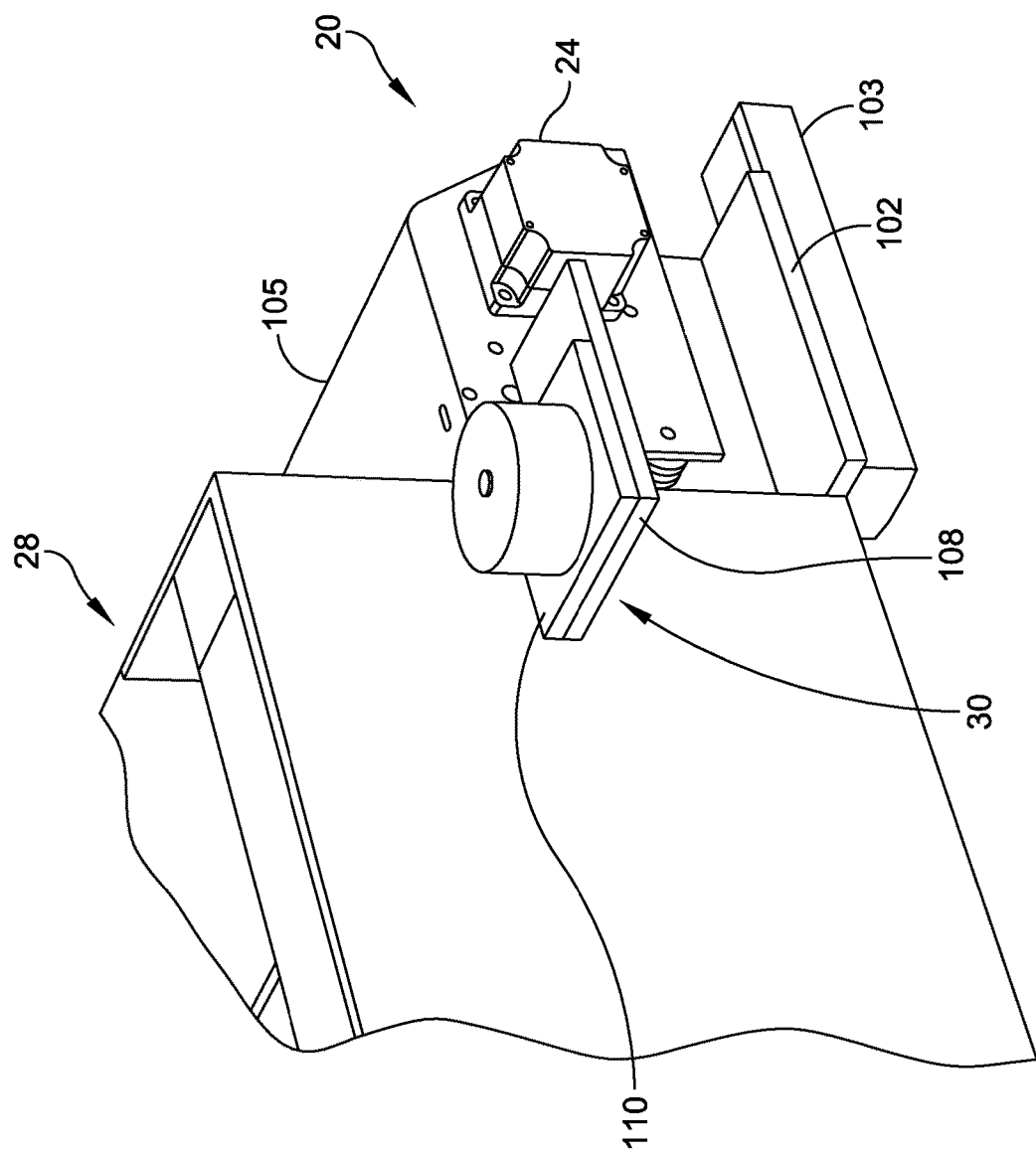
FIG. 4 is a perspective view of a gantry coupled to a modular tool.

In an embodiment, the gantry 20 may interact with at least one modular tool 28 (e.g., see FIG. 4, FIG. 5 and FIG. 6) that may be operatively associated with the frame 22. In some instances, the gantry 20 is can be coupled to and decoupled from one or more modular tools 28. Referring now to FIG. 4, in certain embodiments, a releasable locking mechanism 30 effects, at least in part, the coupling and decoupling of the modular tool 28 to the frame 22, such that the gantry 20 can be connected to and released from multiple modular tools 28.

Figure 5:
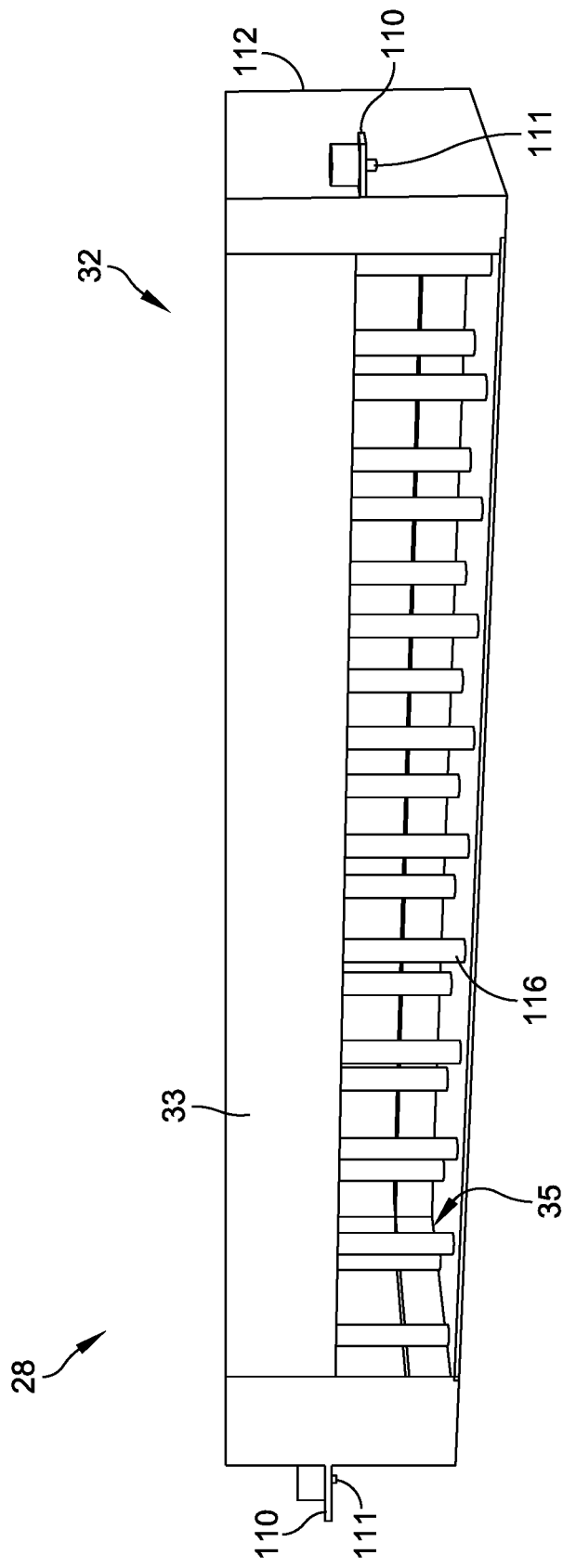
FIG. 5 is a perspective view of a seeding tool.

Referring now to FIG. 5, in some embodiments, a modular tool 28 may be a seeding tool 32. The gantry 20 can be coupled to the seeding tool 32 using the releasable locking mechanism 30 and move along at least one of the axes 14, 16 of the platform 12 using its motor 24. The seeding tool 32 may further include a container bin 26 configured to operate, at least in part, as a seeding bin 33. As the gantry 20 moves, the seeding tool 32 may draw seeds from the seeding bin 33 and distribute them onto the substrate supported by the planar support surface 18. In some instances, the gantry 20 moves to a particular location along the raised rails 19 corresponding to a point of interest along the substrate, where, for example, the seeding tool 32 distributes one or more seeds from the seeding bin 33, with the gantry 20 then moving on to one or more additional substrate locations to repeat the process.

Figure 6:
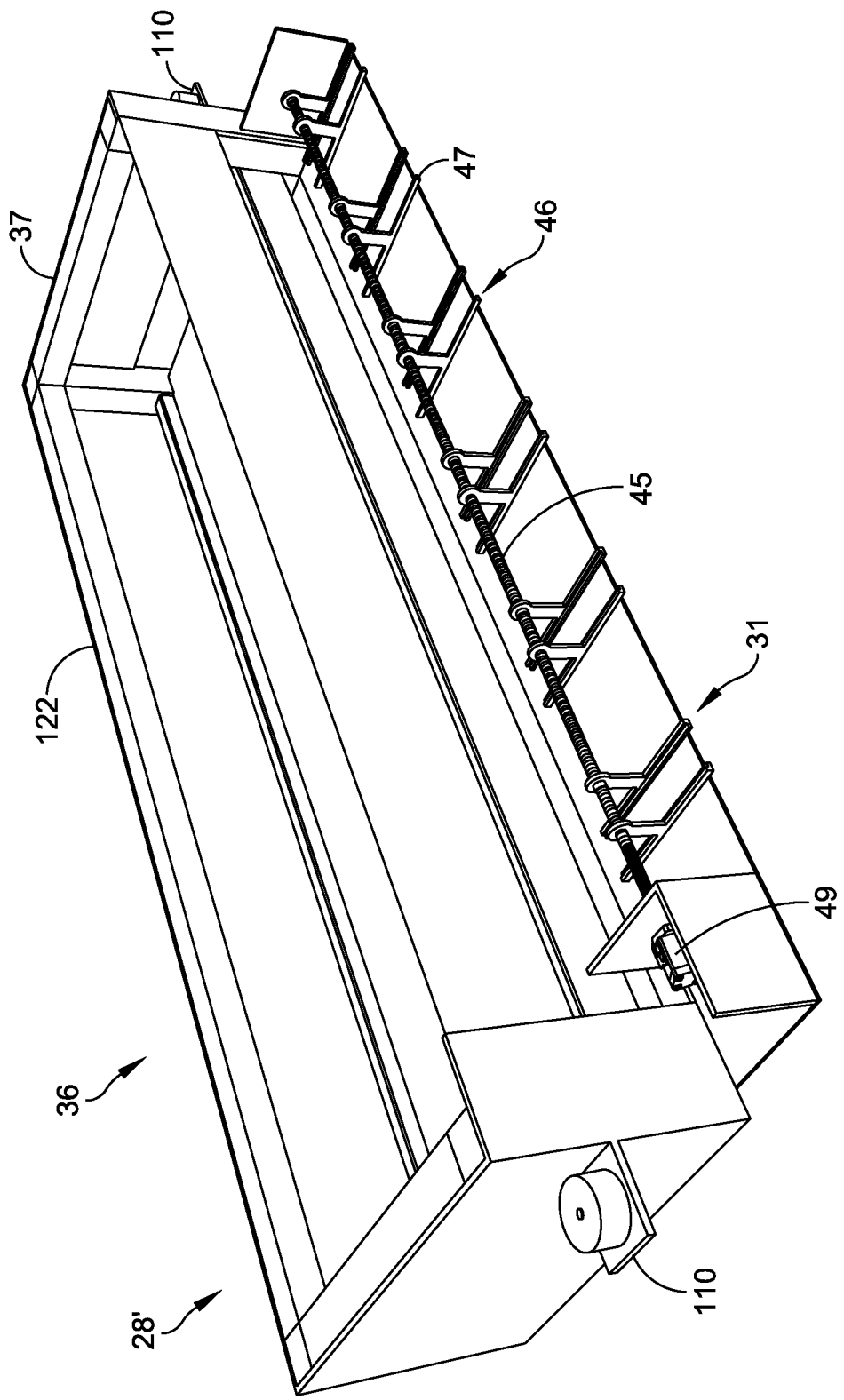
FIG. 6 is a perspective view of a harvesting tool.
Figure 9:
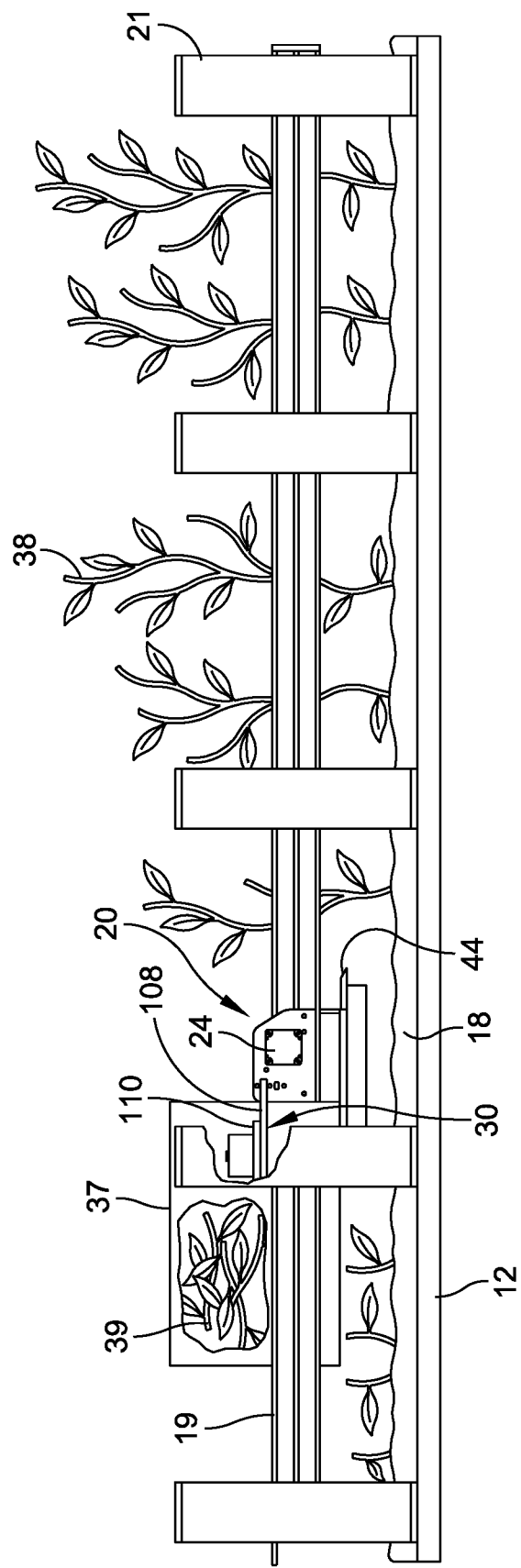
FIG. 9 is a side view in elevation of another horticulture apparatus to plant, grow, and harvest plants.

Referring now to FIG. 6, in some instances, the modular tool 28 is a harvesting tool 36. The harvesting tool 36 harvests one or more plants 38 (e.g., see FIG. 9) which have obtained a desired growth condition conducive to harvesting. The harvesting tool 36 can include a container bin 26 configured as a harvesting bin 37 operable to collect one or more harvested plants 38. The gantry 20 can be coupled to the harvesting tool 36 using the releasable locking mechanism 30. A motor 24, in some instances, moves the gantry 20 along at least one axes 14, 16 of the platform 12 and the harvesting tool 36 contemporaneously harvests, collects, or both, one or more plants 38.

There are several alternative methods for harvesting tool 36 operations, where the appropriateness of such operation may depend on, at least in part, the particular harvesting procedures for the species of plants 38 grown in the substrate 18. By way of a first non-limiting example, the harvesting tool 36 may include a harvesting mechanism 31, which may further include a horizontal blade 40, which cuts the plants 38 at a predetermined height. The harvesting tool 36 may further include a rotating brush 42, situated behind the horizontal blade 40 with respect to the direction of travel of the gantry 20. The rotating brush 42 may spin as the gantry 20 moves, contacting the harvested plant matter 39 cut by the horizontal blade 40 and directing it into the harvesting bin 37.

Figure 8:
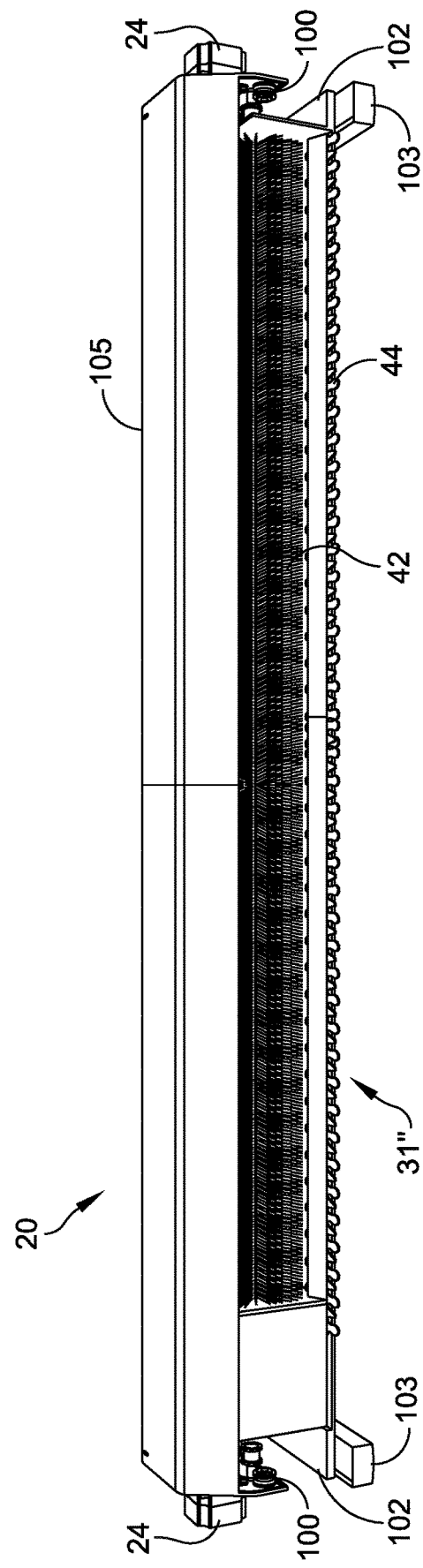
FIG. 8 is a perspective view of components of another harvesting tool and gantry.

Referring now to FIG. 8, by way of a second non-limiting example, the harvesting mechanism 31 may include shears 44 which move in a manner constituting a severing motion that servers the plants 38 at a desired location as the gantry 20 moves along at least one axes 14, 16 of the platform 12. The harvesting tool 36 may further include a rotating brush 42 operable to contact and direct harvested plant matter 39 (e.g., see FIG. 9) into the harvesting bin 37. Other embodiments of the harvesting tool 36 and harvesting mechanism 31 are possible which will nonetheless remain within the scope of the invention, as would become apparent to persons having ordinary skill in the art after having become familiar with the teachings provided herein.

Figure 10:
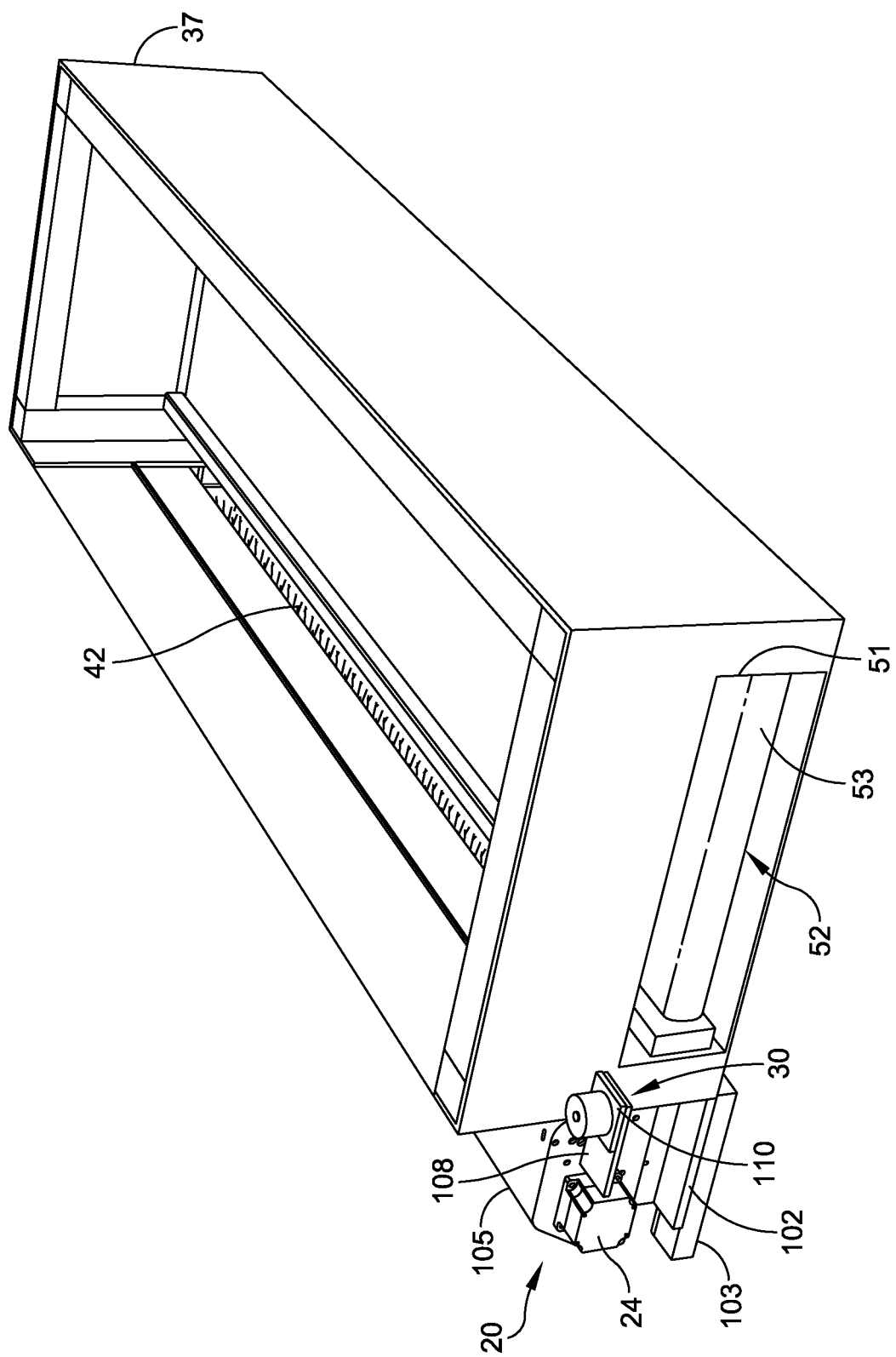
FIG. 10 is a perspective view of a harvesting bin.
Figure 11:
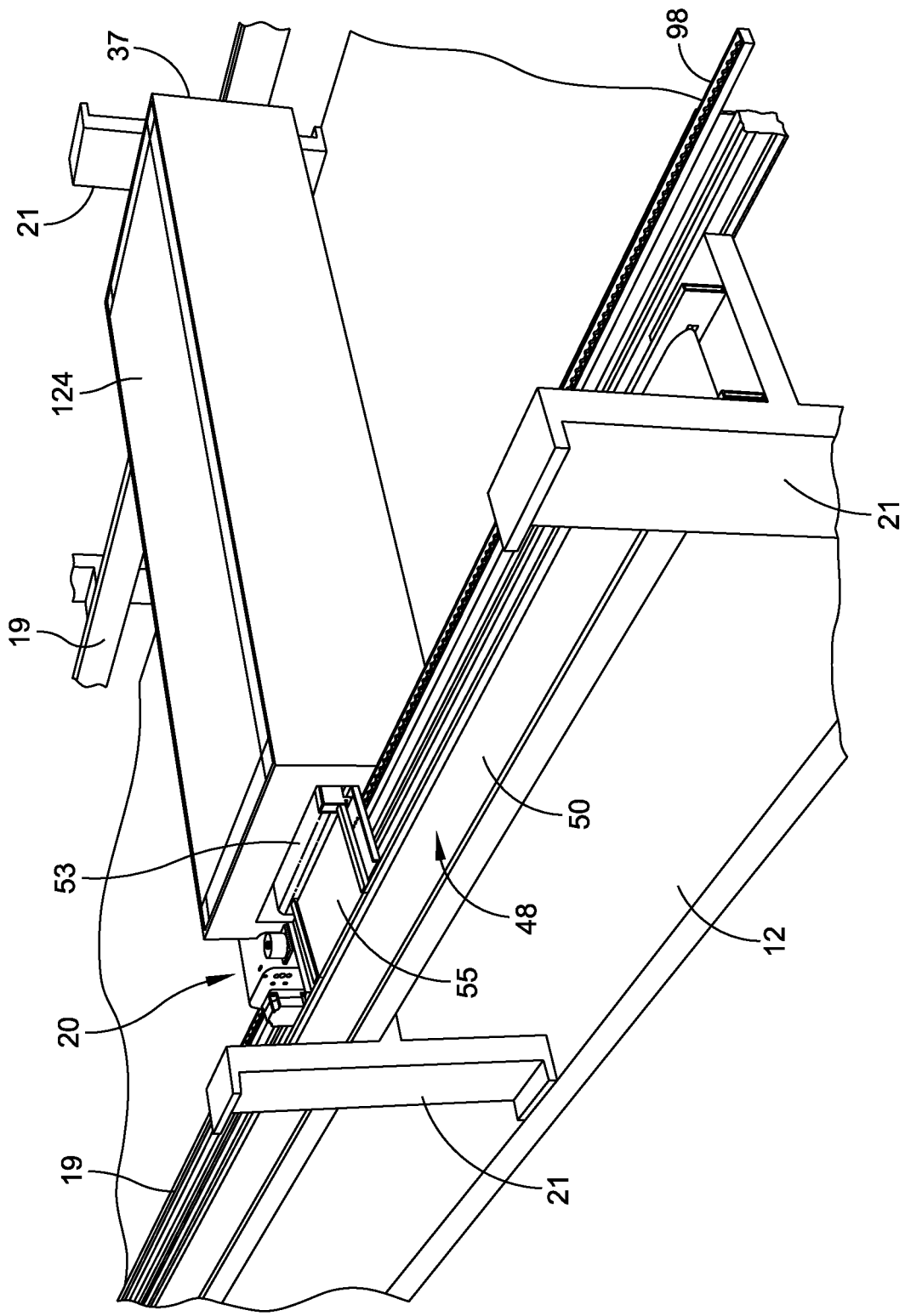
FIG. 11 is a perspective view of a harvested plant matter removal mechanism.

Referring now to FIG. 11, a removal mechanism 48 may collect and remove harvested plant matter 39 from the harvesting bin 37 as the gantry 20 moves along at least one axes of the platform 12. In an embodiment, the removal mechanism 48 may include a platform conveyor 50 which runs along one edge or both edges of the platform 12 on an axis parallel to the axis of travel of the gantry 20. In certain embodiments, the gantry 20 harvesting bin 37 may further include a harvested plant delivery mechanism 52 (see FIG. 10) which directs harvested plant matter 39 from within the harvesting bin 37 towards the platform conveyor 50. In this embodiment, the platform conveyor 50 receives the harvested plant matter 39 from the harvested plant delivery mechanism 52 as the gantry 20 moves along at least one axes 14, 16 of the platform 12, transporting the harvested plant matter 39 away from the platform 12.

A controller may control the activity of the gantry 20 and its associated elements. The controller may direct one or more of the operation of, the motor 24 in order to move the gantry 20 along at least a portion of the platform 12, the releasable locking mechanism 30 to connect to, disconnect from, or operate one or more modular tools 28, and the like. The controller may also interface with one or more plant growth sensors, such as an optical sensor, to monitor the growth of the plants 38. In some instances, the controller receives sensor information and processes that information to determine when to instruct the gantry 20 to begin the harvesting process and at least some of the correct parameters for harvesting operations.

Figure 12:
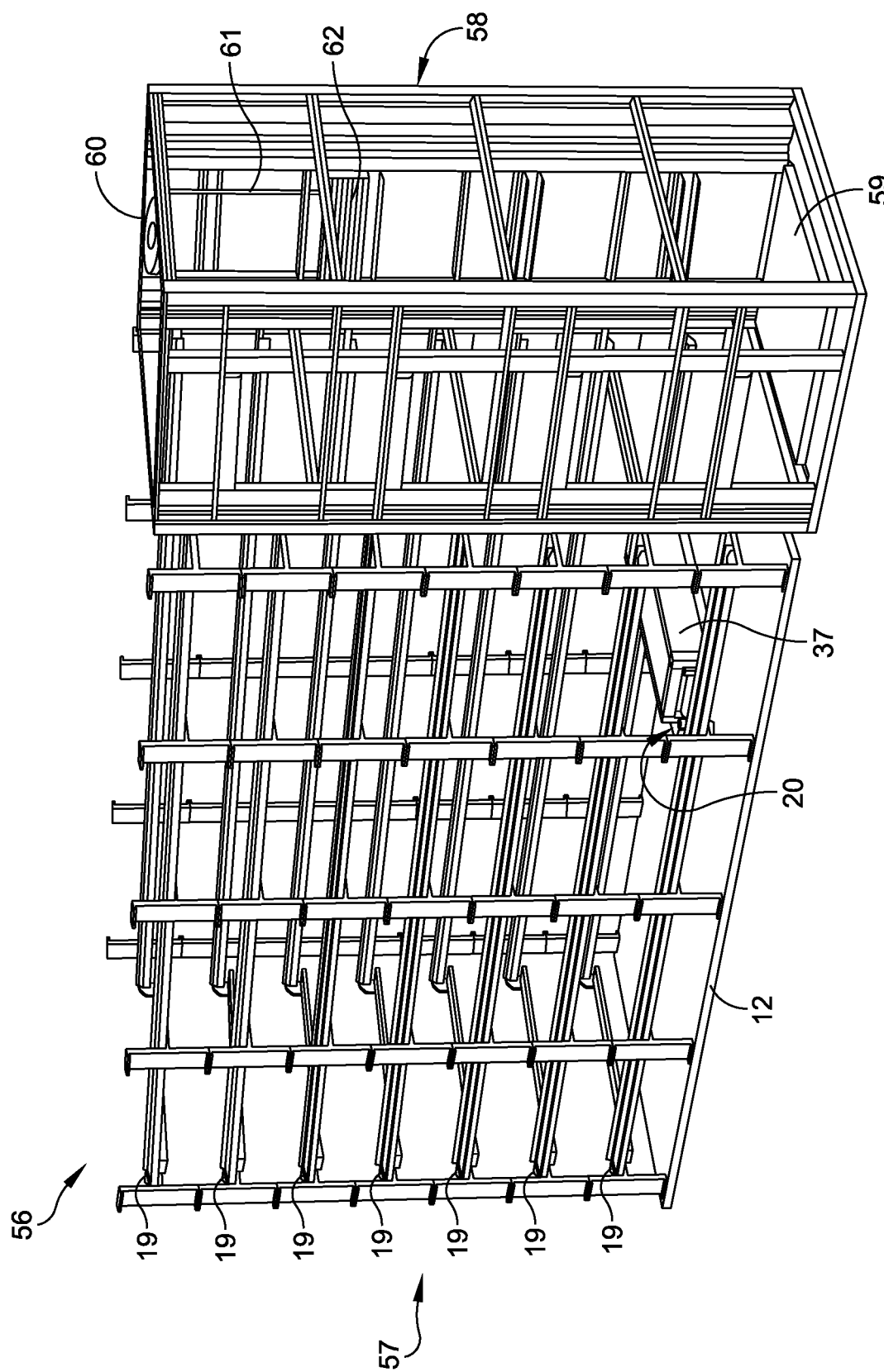
FIG. 12 is a perspective view of an embodiment of a rack of stacked horticulture apparatuses to plant, grow, and harvest plants.

Referring now to FIG. 12, in some embodiments, the horticulture apparatus 10 includes a plurality of platforms 12, each of which includes an associated substrate 18 providing a suitable growth environment for one or more plants 38. These platforms 12 may be supported by one or more racks 56, which may stack the platforms 12 on top of one another in, for example, a vertical configuration 57 while permitting sufficient space between the platforms 12 for the gantry 20 to traverse each platform 12 along a pre-determined axis without coming in contact with another platform. In this horticulture apparatus 10 configuration, an elevator 58 may provide the gantry 20 with access to the separate platforms 12 in the rack 56. To facilitate this access, the controller may direct the motor 24 to move the gantry 20 off of a particular platform 12 and onto the elevator 58. The controller may then direct the elevator 58 to move the gantry 20 to a second platform 12 in the rack 56. Once at the level of the second platform 12, the controller may engage the gantry 20 motor 24 to move the gantry 20 out of the elevator 58 and onto the second platform 12.

In some embodiments, the horticulture apparatus 10 may further include one or more light sources to provide electromagnetic radiation to support the photosynthesis and growth of the plants 38 in the platform 12 substrate 18. In some embodiments that utilize a rack 56 to support a plurality of platforms 12, light sources may be mounted to the undersides of the platforms 12, so that each platform 12 receives light from the platform 12 positioned above it. In some instances, a separate light source mount may provide light for the highest platform 12 in the rack 56.

In still another embodiment, the horticulture apparatus 10 may include a plurality of racks 56, each of which contains a plurality of platforms 12 stacked in a vertical configuration 57. The plurality of racks 56 may together include a three-dimensional array 64 of racks 56. In some instances, the plurality of racks 56 and the platforms 12 contained therein may be serviced by a single gantry 20 and elevator 58 through the use of one or more horizontal transfer mechanisms 65 capable of moving the gantry 20, and any modular tools 28 connected to the gantry 20, horizontally between the separate racks 56 of the array 64. In other embodiments, multiple gantries 20, multiple elevators 58, or both, service the plurality of racks and platforms.

Figure 13:
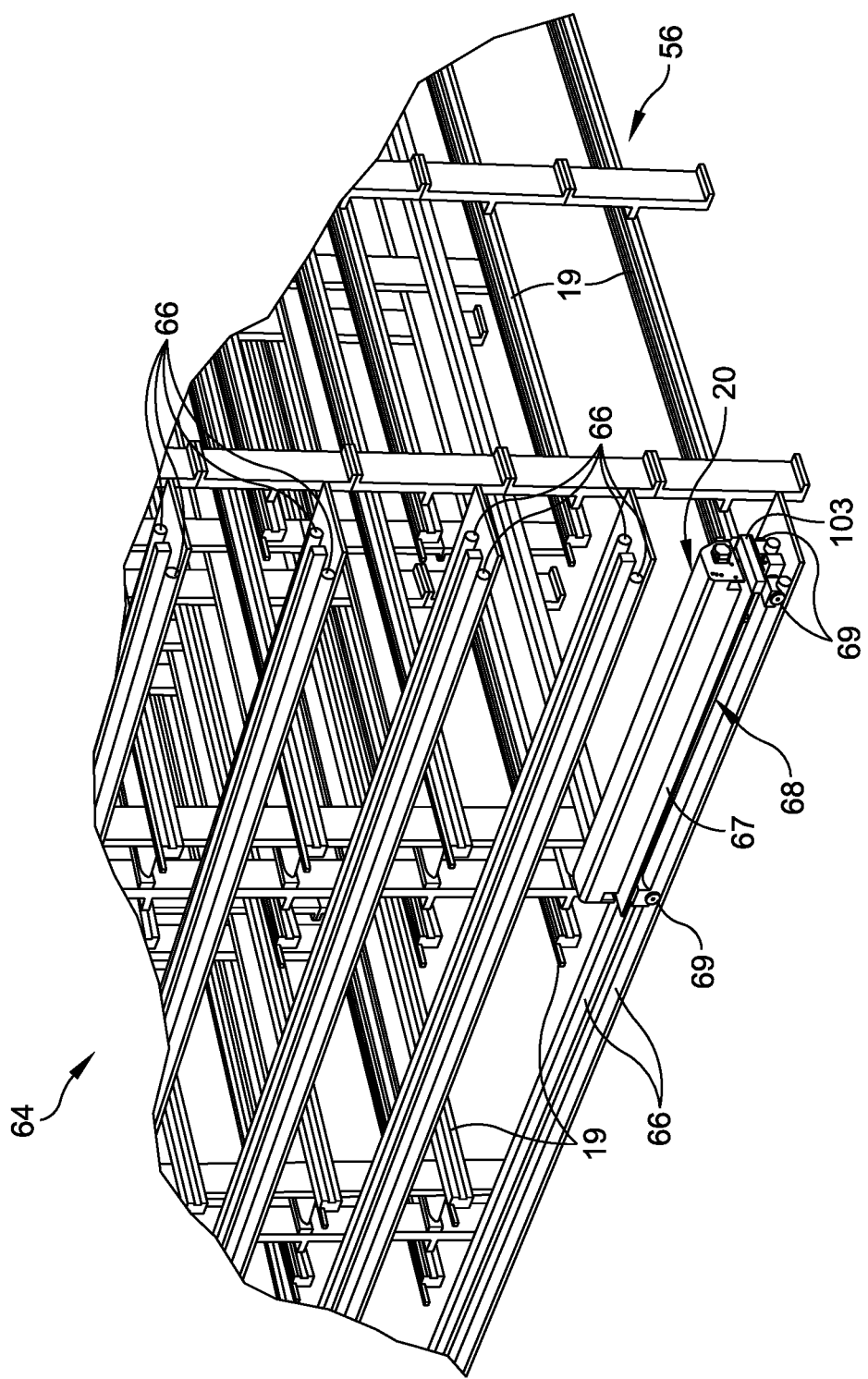
FIG. 13 is a perspective view of an embodiment of multiple racks of stacked horticulture apparatuses to plant, grow, and harvest plants.

Referring now to FIG. 13, in some embodiments, the horizontal transfer mechanism 65 includes a series of horizontal rails 66 mounted proximal to one or more of the platform 12 levels in the array 64. A horizontal carrier 68 may be positioned at one or more platform 12 levels in the array 64, where each horizontal carrier 68 is configured to move in a reciprocating manner along its particular pair of horizontal rails 66 while carrying the gantry 20, and one or more modular tools 28 connected to the gantry 20, if any. In some embodiments, the controller directs the elevator 56 to carry the gantry 20 and any connected modular tools 28 to a particular platform level in the array 64. The controller then directs the gantry 20 to move off of the elevator and onto a horizontal carrier 68, from which the gantry 20 and its connected modular tool 28 may then transit horizontally to a particular platform 12.

In the above-described embodiment, gantry 20 movement between the various racks 56 of the array 64, and the plurality of platforms 12 supported by each rack 56, can be facilitated by a single vertical elevator 58 and multiple horizontal carriers 68 and pairs of rails 66, with a separate horizontal carrier 68 and pair of rails 66 at each platform 12 level of the various racks 56. Alternatively, gantry 20 access could be facilitated by a single horizontal carrier 68 and pair of rails 66, and multiple elevators 58 at each rack 56 to enable the vertical travel of the gantry 20.

Figure 14:
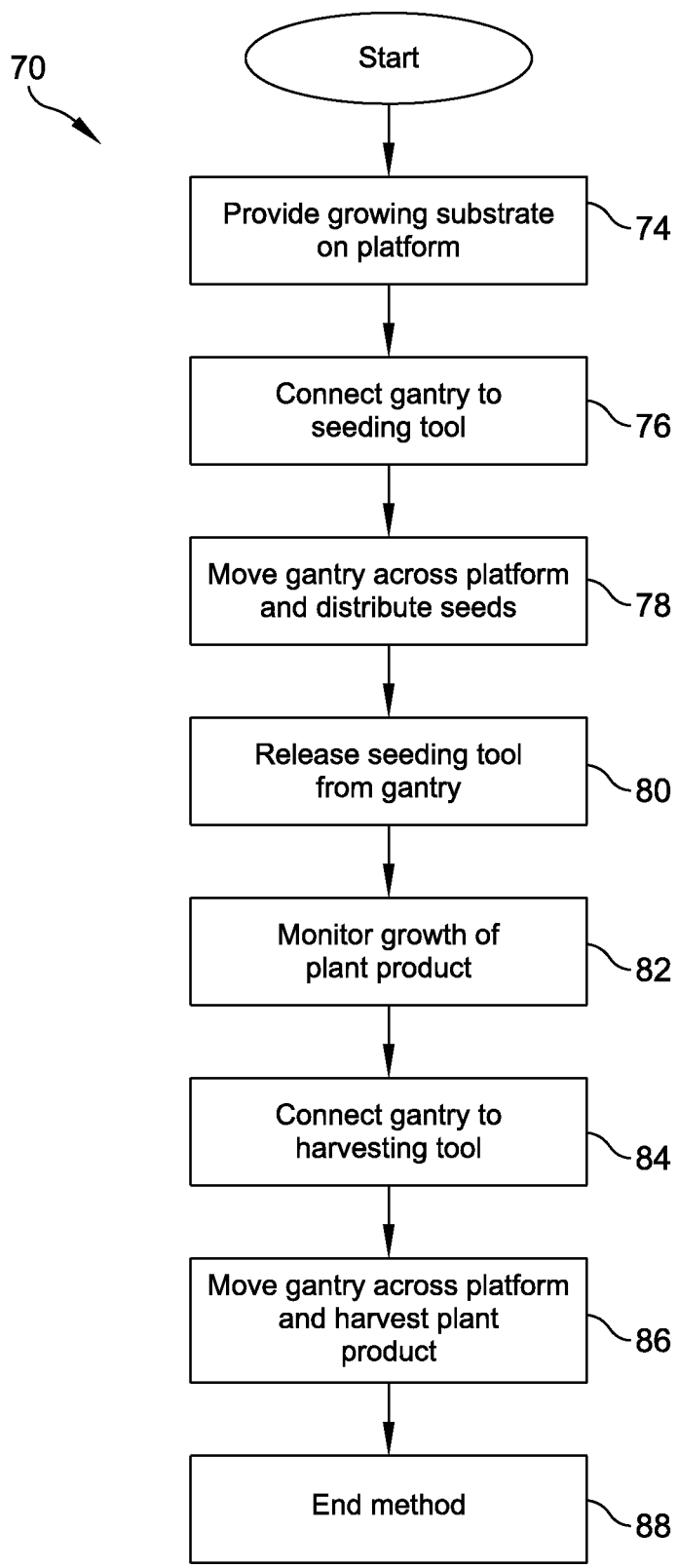
FIG. 14 is a flow diagram of a method to plant, grow, and harvest plants.

Referring now primarily to FIG. 14, the horticulture apparatus 10 may be used in accordance with a method 70 to grow and harvest plants via a platform 12, gantry 20, and plant growth sensor. At block 74, a suitable substrate 18 is provided on a platform 12 in which to grow plants 38. At block 76, a gantry 20 sized to straddle and move along at least one of the axes 14, 16 of the platform 12 connects to a seeding tool 32 at a first interval in time. The seeding tool 32 includes a seeding bin 33, which contains seeds to be planted in the platform 12 substrate 18.

At block 78 of the method 70, the gantry 20 is moved along at least one of the axes 14, 16 of the platform 12 while the seeding tool 32 simultaneously draws seeds from the seeding bin 33 and distributes them onto the platform 12 substrate 18. At block 80, the gantry 20 finishes its use of the seeding tool 32 and disconnects from the seeding tool 32. At block 82, the plant growth sensor monitors the growth of the plants 38 over time in order to determine when the plants 38 are suitable for harvest.

At block 84 of the method 70, and at a second time interval after the plants 38 have had sufficient time to grow and mature, the gantry 20 connects to a harvesting tool 36. The harvesting tool includes a harvesting bin 37 connected to the harvesting tool 36 and is oriented to receive harvested plant matter 39 from the harvesting tool 36. Finally, at block 86, the gantry 20 again moves along at least one of the axes 14, 16 of the platform 12 as the harvesting tool 36 severs the plants 38 growing in the substrate 18 and places the harvested plant matter 39 in the harvesting bin 37.

Having briefly described certain embodiments of the horticulture apparatus 10 and method 70, and some of their more significant features and advantages, various embodiments and alternative configurations of the horticulture apparatus 10 and method 70 will now be described in detail.

Referring again to FIG. 1, and as briefly described earlier, the horticulture apparatus 10 may include a platform 12 having a width axis 14 and a length axis 16. The platform 12 may be made of materials commonly used in the agricultural industry, such as metal, plastic, or wood. In some embodiments, the platform 12 may consist of a horizontal metal platform constructed of steel.

Although many embodiments of the horticulture apparatus 10 described herein utilize a horizontal platform 12, other configurations are possible. In an alternative embodiment, the platform 12 may be oriented vertically, so that its width axis 14 rises from the ground. Such a vertical platform 12 orientation may facilitate the growth of vertically-growing vine-type plants (not illustrated), such as grapes and cucumbers. In some embodiments, the platform 12 is not planar, but is structured with variations in height, width, or both.

The platform 12 may support a substrate 18 which provides nutrients suitable in which to plant seeds and grow plants 38. In some embodiments, the substrate 18 may include soil or dirt, the variety of which may be selected to enhance growth conditions for one or more plants 38 the horticulture apparatus 10 will cultivate. The platform may further include an irrigation system, which may deliver water, other liquid nutrients, or both such as, for example, nitrate nitrogen to the substrate 18 at predefined intervals. In a horticulture apparatus 10 embodiment utilizing multiple platforms 12 supported by a rack 56, the irrigation system may include a network of flexible plastic tubes connected to the undersides of the platforms 12 and oriented to distribute water and liquid nutrients to the platform 12 below. In this embodiment, the plastic tubes may also extend above the highest platform 12 in the rack 56, in order to provide water and liquid nutrients to it as well.

In a separate horticulture apparatus 10 embodiment, the substrate 18 may include hydroponic aquaculture, which provides mineral and nutrient solutions in a water solvent to grow plants 38. In this embodiment, the platform 12 may be configured in a trough shape to provide a container in which the hydroponic substrate 18 may flow. This embodiment may further include a hydroponic filtration system, which circulates fresh nutrients in the hydroponic substrate 18 to keep the plants 38 growing at a high efficiency.

The horticulture apparatus 10 may further include a gantry 20 which is sized to straddle and move across the platform 12 along one of its two axes 14, 16. The gantry 20 may include a frame 22 which straddles the platform 12 and provides structural strength and contact points to which the other components of the gantry 20 are mounted. The frame 22 may be constructed of metal. In some embodiments, the frame 22 may be constructed of aluminum.

Figure 3:
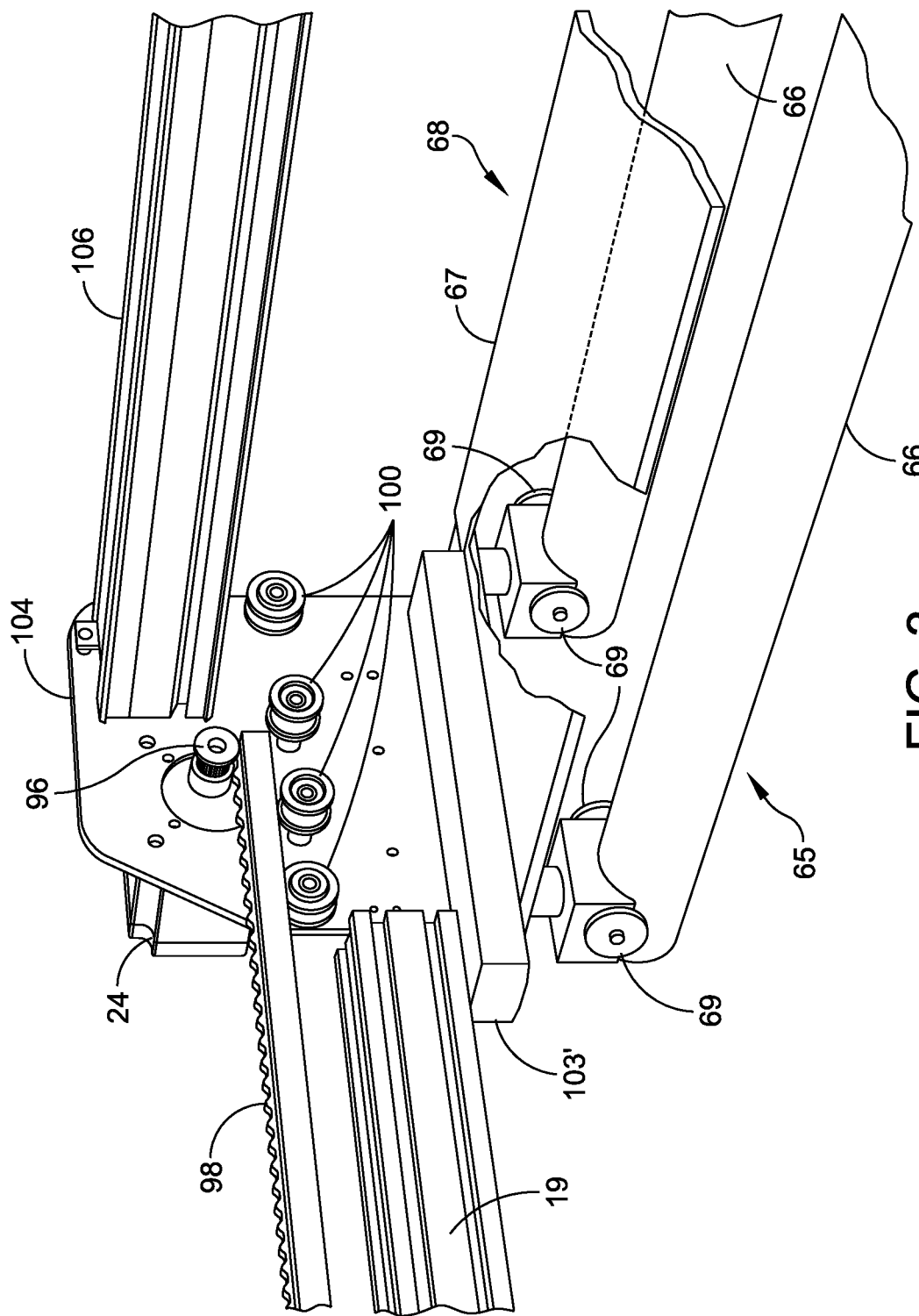
FIG. 3 is a perspective view of gantry frame components and a horizontal carrier.

With reference now primarily to FIG. 2 and FIG. 3, the gantry 20 frame 22 may include two vertical legs 104 which may be connected by one or more horizontal beams 106, 106'. The legs 104 may provide the contact points at which the frame 22 meets the edges of the platform 12, while the horizontal beam 106 straddles the platform 12 and may provide a mounting point for other gantry 20 components, as described below. One or both of the frame 22 legs 104 may further include at least one pinion gear 96 which may fit into at least one linear rack gear 98 which may be mounded to the edge of the platform 12. This arrangement can permit the gantry 20 to move along the platform 12 as a result of the turning of the pinion gear 96, thereby converting the rotational motion of the pinion gear 96 into linear motion across the platform 12.

In an alternative embodiment, the platform 12 may further include a raised track 19 for the gantry 20 to utilize to move along at least one of the axes 14, 16 of the platform 12. The track 19 may be supported on either side of the platform 12 by a series of posts 21. The track 19 may further include the aforementioned linear rack gear 98 to provide the gantry 20 pinion gear 96 with traction to move the gantry 20 along at least one of the axes 14, 16 of the platform 12.

The frame 22 legs 104 may further include one or more wheels 100 which may transmit the weight of the gantry 20 to the platform 12 or track 19. Alternatively, the wheels 100 may align with and grip the underside of the platform 12 or track 19 linear rack gear 98 (e.g., see FIG. 3). The frame 22 legs 104 may further include a flange 102 having a flat shape, which may grip the underside of the platform 12 or track 19. As the gantry 20 moves along at least one of the axes 14, 16 of the platform 12 or track 19, the combination of the pinion gear 96, the wheels 100, and the flanges 102 may securely fasten the gantry 20 to the platform 12 or to the track 19 and permit precise or near-precise control of the gantry 20 position with respect to the platform 12.

One or more motors 24 may drive the pinion gear 96 to move the gantry 20 across the platform 12. The motor(s) may include electrical servomotors. In an alternative gantry 20 embodiment (not illustrated) which does not include a pinion gear 96 on either frame 22 leg 104, the motor(s) 24 may drive the frame 22 wheels 100 directly, which may rely, at least in part, on adhesive friction to move the gantry 20 across the platform 12. The motor(s) may draw electrical power through the contact which the frame 22 pinion gear 96 or wheels 100 make with the platform 12. In an alternative embodiment, the gantry 20 may be powered by an onboard battery (not illustrated). The gantry 20 may further include a gantry cover 105 to provide protection to the frame 22 and aforementioned components.

The horticulture apparatus 10 may further include a releasable locking mechanism 30, which may permit the gantry 20 to connect to one or more modular tools 28. A component of the releasable locking mechanism 30 may be mounted to the frame 22 of the gantry 20. More specifically, a flat bracket 108 may be mounted to each of the two gantry 20 legs 104 (e.g., see FIG. 4). The flat brackets 108 may contain a hole into which a releasable locking pin 111 may be inserted.

The gantry 20 may move against and contact a modular tool 28 using its motor 24. In doing so, the releasable flat bracket 108 on each of the two legs 104 may draw adjacent to and abut a similar pair of mating brackets 110 on the modular tool 28. The mating brackets 110 of the modular tool 28 may engage releasable locking pins 111 into the holes of the gantry 20 flat brackets 108, thereby securing the two brackets 108, 110 together and locking the gantry 20 to the modular tool 28. Although the flat bracket 108, mating bracket 110, and releasable locking pin 111 together comprise an exemplary embodiment of a releasable locking mechanism 30, other such releasable locking mechanisms 30 are possible which would nonetheless remain within the scope of the invention, as would become apparent to persons having ordinary skill in the art after having become familiar with the teachings provided herein.

In some embodiments, the flat surfaces of the flat brackets 108 and mating brackets 110 may be constructed of metal, and may permit the flow of electricity and communication signals between the gantry 20 and the modular tool 28. The releasable locking pins 111 may be actuated by any means which permits their controlled extension and retraction, such as by linear actuators. Through the metal connection of the flat brackets 108 and the mating brackets 110, the modular tool 28 may draw electrical power in order to operate its onboard equipment, as will be described below.

The gantry 20 may be capable of moving across the platform 12 or track 19 while connected to the modular tool 28. The modular tool 28 may include a flange (not illustrated) which transmits the weight of the modular tool 28 onto the platform 12 or track 19. The modular tool 28 may further include one of several modules designed to perform specific plant cultivation tasks. Referring again to FIG. 5, the modular tool 28 may include a seeding tool 32. The seeding tool 32 may include a generally box-shaped structure 112 in which the longest structure dimension is similar in length to the length of the horizontal beam 106 of the gantry 20. The seeding tool 32 may, at least in part, be constructed of metal, plastic, or composite material and may further include an internal cavity which may hold seeds. In some embodiments, the seeding tool 32 may be constructed of ultraviolet-opaque food-grade plastic.

The seeding tool 32 may additionally include a seeding mechanism 35 to place seeds from within the seeding bin 33 onto the platform 12 substrate 18. In one embodiment, the seeding mechanism 35 may include a simple gate (not illustrated), which may be opened and closed by the controller, as will be further described below, to enable seeds to flow out of the seeding bin 33 onto the platform 12 substrate 18. The gate may be actuated by a servo or linear actuator mounted to the seeding bin 33, under the command of the controller. In this manner, the gantry 20 may move across the platform 12 while the seeding tool 32 places seeds on the platform 12 substrate 18 in a controlled manner.

Still referring to FIG. 5, in an alternative embodiment, the seeding mechanism 35 may include one or more vertical seed tubes 116 which are situated beneath the seeding bin 33. Each of these seed tubes 116 may be connected to the seeding bin 33 by a solenoid valve (not illustrated), which may be opened and closed to permit seeds from the seeding bin 33 to fall into the seed tubes 116 in a controlled manner. As the gantry 20 moves the seeding tool 32 across the platform 12, the controller may direct various seeding tubes 116 to open and release a controlled quantity of seeds onto specific locations on the platform 12 substrate 18.

Referring again to FIG. 6, in a separate embodiment, the modular tool 28' is a harvesting tool 36. The harvesting tool 36 may be capable of collecting harvested plant matter 39 from plants 38 that grow in the platform 12 substrate 18 when the plants 38 are mature and ready to be harvested. The gantry 20 may connect to and disconnect from the harvesting tool 36 using the previously-described releasable locking mechanism 30, with the harvesting tool 36 utilizing a mating bracket 110. When connected to the harvesting tool 36, the gantry 20 may move the harvesting tool 36 across the platform to harvest grown plants 38.

In one embodiment, the harvesting tool 36 may include a generally box-shaped structure 122 in which the longest structure dimension is similar in length to the length of the horizontal beams 106 of the gantry 20. The harvesting tool 36 may, at least in part, be constructed of metal, plastic, or composite material. In this embodiment, the harvesting tool 36 may further include a harvesting mechanism 31 to harvest plants 38 and a harvesting bin 37 with an internal cavity to collect the harvested plant matter 39. The harvesting bin 37 may be arranged adjacent to the harvesting mechanism 31, so that harvested plant matter 39 may be passed from the harvesting mechanism 31 into the harvesting bin 37 according to the exemplary embodiments described below. In some embodiments, the harvesting bin 37 may, at least in part, but constructed of ultraviolet-opaque food-grade plastic, may be covered by a lid 124, or both.

Referring again to FIG. 7, in some instances, the harvesting mechanism 31' may include a horizontal blade 40. The horizontal blade 40 is a simple blade that is oriented horizontally along the same axis as the horizontal beam 106 of the gantry 20 frame 22, and which severs the plants 38 growing in the platform 12 as the gantry 20 moves along one or more of the axes 14, 16 of the platform 12. In some embodiments, the horizontal blade 40 is a band saw 118. The band saw 118 may also be oriented horizontally along the same axis as the horizontal beam 106 of the gantry 20 frame 22. In this manner, the band saw 118 is angled to cut into the plants 38 growing in the platform 12 substrate 18 as the gantry 20 moves across the platform 12. The band saw 118 may include a continuous band of toothed metal as is known in the art, looped around pulleys 120, 120' situated at each end of the horizontal beam 106 of the frame 22. At least one of these pulleys 120, 120' may be powered by an electric motor.

In one embodiment, the harvesting bin 37 (not illustrated in FIG. 7) may have an opening that is situated adjacent to the band saw 118 harvesting mechanism 31'. As the gantry 20 moves across the platform 12 and the harvesting mechanism 31' cuts and harvests the plants 38, the motion of the gantry 20 may force the harvested plant matter 39 into the harvesting bin 37 through this opening.

Figure 7:
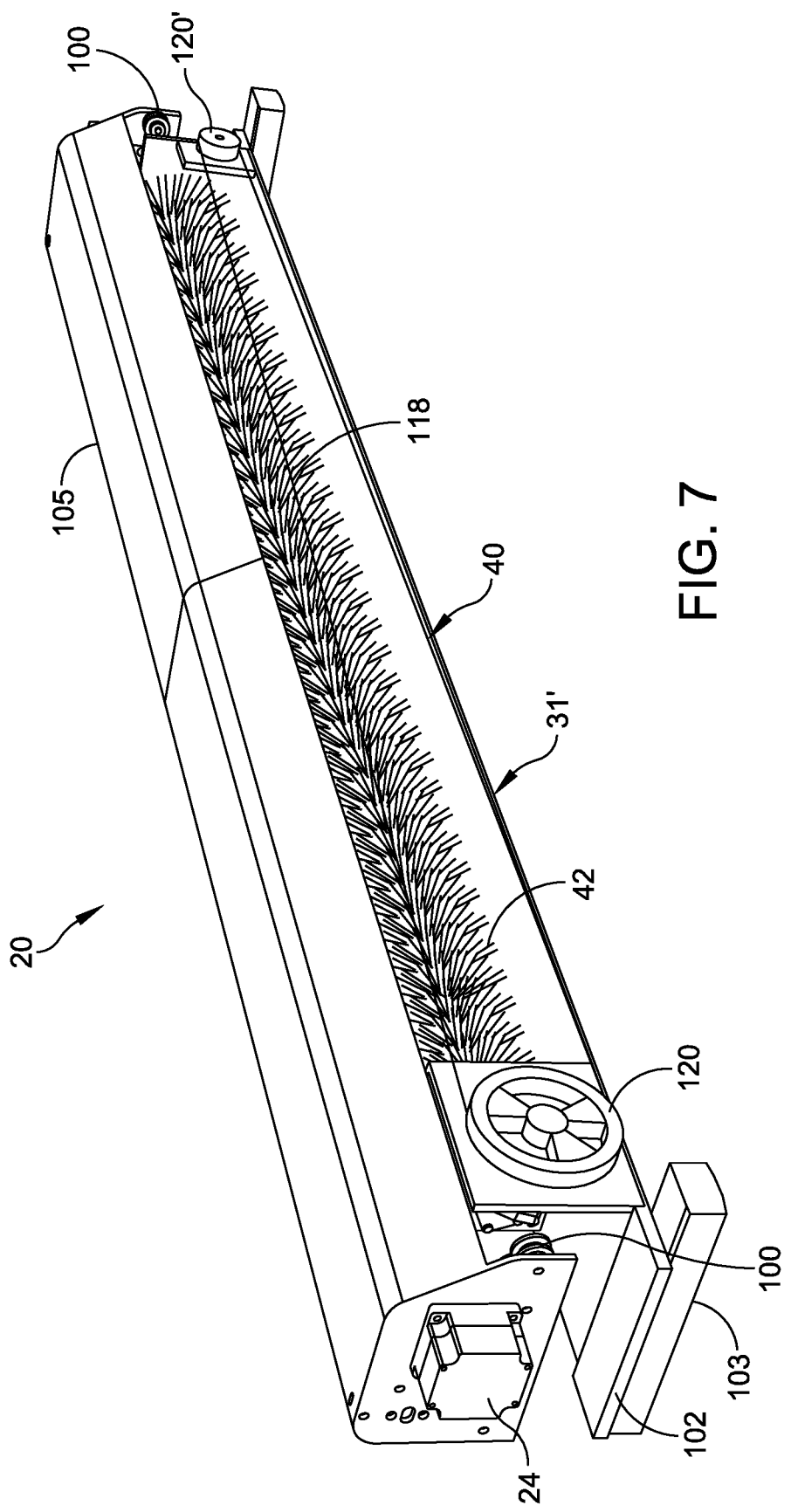
FIG. 7 is a perspective view of components of another harvesting tool and gantry.

Still referring to FIG. 7, a rotating brush 42 may be situated between the harvesting mechanism 31' and the opening of the harvesting bin 37. The rotating brush 42 may spin as the gantry 20 moves, and its bristles may contact the harvested plant matter 39 that passes through the harvesting mechanism 31', thereby scooping and directing the harvested plant matter 39 into the harvesting bin 37. In some instances, the rotating brush 42 bristles may be constructed of rubber or plastic, or a string-type material such as yarn.

Referring now to FIG. 8, in a further alternative embodiment, an embodiment of the harvesting mechanism 31" may include a scissor-type mechanism, such as shears 44. The shears 44 may be arranged in a horizontal array along the same axis as the horizontal beam 106 of the gantry 20 frame 22. In this way, the shears 44 may contact and harvest the plants 38 growing in the platform 12 substrate 18 by cutting them as the gantry 20 moves across the platform 12. The harvested plant matter 39 may then pass directly into the harvesting bin 37 (not illustrated in FIG. 8), or it may be further pushed into the harvesting bin 37 by the aforementioned rotating brush 42. The shears 44 may, at least in part, be constructed of metal or plastic, and may be powered by an electrical motor to provide the appropriate powered shearing mechanism.

Referring again to FIG. 6, in a separate alternative embodiment, the harvesting mechanism 31 may include a lifting mechanism 46. This lifting mechanism may contact the plants 38 as the gantry 20 moves across the platform 12 and may pull the plants 38 out of the substrate 18 and into the harvesting bin 37 without cutting them. In a further embodiment, the lifting mechanism 46 may include pairs of lifting fingers 47, which may spread around and encircle large blocky plants (not illustrated) growing in the substrate 18, such as, for example, iceberg lettuce. In one embodiment, the pairs of lifting fingers 47 may be attached to a rod 45, which may be driven by an electrical motor 49 to rotate the rod 45 and thereby rotate the pairs of lifting fingers 47 upward as they grip the plants 38, pulling the plants 38 out of the substrate 18. The motor 49 may continue to rotate the rod 45 until the pairs of lifting fingers 47 rotate backward far enough to spill the plants 38 into the harvesting bin 37, at which point the motor 49 may rotate the rod 45 in the opposite direction to bring the pairs of lifting fingers 47 into alignment with the next set of plants 38 to harvest.

In an alternative embodiment, the aforementioned motor 49 may turn a lift screw (not illustrated) to lift the rod 45, and thereby all the pairs of lifting fingers 47 attached to the rod 45, upward and away from the platform 12 beneath the gantry 20. In this way, the pairs of lifting fingers 47 can encircle and pick up plants 38 from the substrate 18 without the use of a cutting mechanism. The rod 45 may then rotate the pairs of lifting fingers 47 backward to tilt the picked-up plants 38, now separated from the substrate 18, into the harvesting bin 37. The rod 45 and pairs of lifting fingers may be constructed of metal, plastic, or composite material.

Referring now to FIG. 10 and FIG. 11, the horticulture apparatus 10 may further provide a removal mechanism 48 to remove harvested plant matter 39 from the harvesting tool 36 as the gantry 20 moves across the platform 12 and collects harvested plant matter 39. In one embodiment, the removal mechanism 48 may include a platform conveyor 50 which is oriented adjacent to and parallel with the length axis 16 of the platform 12, on an axis parallel to the axis of travel of the gantry 20. The platform conveyor 50 may include a rubber or fabric conveyor band stretched between rollers, one or more of which rollers may be turned by electrical motors, although other conveyor configurations are possible which nonetheless would remain within the scope of the invention. In an embodiment, the harvesting bin 37 may have a harvested plant delivery mechanism 52 to direct harvested plant matter 39 towards the platform conveyor 50. In one embodiment, the harvested plant delivery mechanism 52 may include an internally-slanted, wedge-shaped floor to channel harvested plant matter 39 through an aperture 51 in the side wall of the harvesting bin 37. In this way, as harvested plant matter 39 accumulates in the harvesting bin 37, the natural pull of gravity will direct it towards and then through the aperture 51, where the harvested plant matter 39 may fall onto the platform conveyor 50 and be transported away from the harvesting bin 37.

In an alternative embodiment, the harvested plant delivery mechanism 52 may include a delivery conveyor 53 mounted inside the harvesting bin 37. The delivery conveyor 53 may include a rubber or fabric conveyor band stretched between rollers, one or more of which rollers are turned by electrical motors. The delivery conveyor 53 may be oriented within the harvesting bin 37 at an angle perpendicular to that of the platform conveyor 50, and facing the harvesting bin 37 aperture 51. As the gantry 20 and harvesting tool 36 move across the platform 12 and harvest plants 38, the harvested plant matter 39 may enter the harvesting bin 37 and contact the delivery conveyor 53. The delivery conveyor 53 may then carry the harvested plant matter 39 to the harvesting bin 37 aperture 51, and exhaust it onto a ramp 55 which allows the harvested plant matter 39 to fall onto the platform conveyor 50 for continued transportation.

In an alternative embodiment that does not require the use of a platform conveyor 50, the harvesting bin 37 of the harvesting tool 36 may further include a quantity sensor capable of detecting when the harvesting bin 37 begins to fill to capacity with harvested plant matter 39. When the harvesting bin 37 reaches capacity, the controller (as will be further described below) may instruct the gantry 20 and harvesting tool 36 to halt harvesting activity. The controller may return the gantry 20 to a preset 'home' location, where the gantry 20 can release the releasable locking mechanism 30 and disconnect from the full harvesting tool 36. In one embodiment, the gantry 20 may now connect to a second harvesting tool 36 with an empty harvesting bin 37 to resume harvesting plants 38. In an alternative embodiment, the harvesting tool 36 may dump the contents of the harvesting bin 37 at this home location, allowing the gantry 20 to reconnect to the same harvesting tool 36 and resume harvesting plants 38, continuing to fill the newly-emptied harvesting tool 36 bin 37.

The aforementioned activity of the gantry 20 and modular tools 28, including the seeding tool 32 and harvesting tool 36 and the component systems and elements therein, as well as other horticulture apparatus 10 components such as the platform conveyor 50, may be controlled by a controller. The controller may direct the gantry 20 to engage its motor 24 to move across the platform 12, or to engage or disengage the releasable locking mechanism 30 to connect to, communicate with and operate one or more modular tools 28. Similarly, the controller may activate features of the seeding tool 32, such as its seeding mechanism 35, and activate features of the harvesting tool 36, such as its rotating brush 42 or shears 44 (depending on the particular embodiment of the harvesting tool), according to the controller operating parameters. For example, as the gantry 20 operates while connected to the aforementioned embodiment of the seeding tool 32 which contains vertical seed tubes 116, the controller may direct the solenoid valves of the seed tubes 116 to open and close at specific intervals of time, thereby depositing seeds on the platform 12 substrate 18 at specific locations.

The controller may include a central processing unit, random access memory, and durable program memory situated on the gantry 20, which may execute program code to perform specified tasks. Alternatively, the controller may operate on a logic device in a remote location, sending commands to the gantry 20, to the modular tools 28 to which the gantry 20 may connect, or both. In one embodiment, the controller may send commands to the gantry 20 and modular tool 28 electrically through the physical connection provided by the contact points of the gantry 20 wheels 100 and pinion gear 96 with the platform 12 or track 19. In an alternative embodiment, the gantry 20 may further include a wireless receiver of the type well-known in the art, which may receive commands from the controller over a local wireless network.

The controller may track the location of the gantry 20 and modular tool 28 using onboard sensors and telemetry. For example, the controller may record how many revolutions the gantry 20 pinion gear 96 has made as the gantry 20 moves across the platform 12 in order to determine the location of the gantry 20 against the known dimensions of the platform 12. The controller may access information from other gantry 20 and modular tool 28 sensors, such as a seed level sensor within the seeding bin 33 of the seeding tool 32 to determine whether the seeding tool 32 is beginning to exhaust its supply of seeds. Similarly, the controller may use a harvesting bin 37 sensor to determine when the harvesting bin 37 has filled to capacity with harvested plant matter 39, and may instruct the gantry 20 to return to a home location to empty the harvesting bin 37 or disconnect from the full harvesting tool 36 and bin 37 in order to connect to a new empty harvesting tool 36 and bin 37.

The controller may permit the activation of the gantry 20 and one or more modular tools 28, such as the seeding tool 32 or the harvesting tool 36, at specific times under the manual request of a user. The controller may also automatically run the gantry 20, connected to a particular modular tool 28, at pre-set times or in a pre-defined pattern. In a further embodiment, the controller may monitor information gathered by one or more plant growth sensors to assess the growth status of the plants 38 in the platform 12 substrate 18 and determine when to direct the gantry 20 and modular tools 28 to plant seeds and harvest plants 38 accordingly. For example, the controller may command the gantry 20 to connect to a harvesting tool 36 via the releasable locking mechanism 30, and to harvest the plants 38 growing in the platform 12 substrate 18, when plant growth sensors have determined that the plants 38 have grown beyond a predetermined height or thickness. The plant growth sensors may use a wide variety of information-gathering sensors to make data available to the controller, including infrared or ultraviolet image data, mass data, laser line-of-sight data to determine plant height, or any other form of data as would be known by persons having ordinary skill in the art. By monitoring information gathered by the plant growth sensors, the controller may be capable of utilizing the gantry 20 and modular tools 28 to seed, plant, grow, and harvest plants 38 automatically without direct operator intervention.

A particular embodiment of the horticulture apparatus 10 may include a plurality of platforms 12, each of which contains its own substrate 18 which provides nutrients suitable in which to grow plants 38. This plurality of platforms 12 may be supported by a rack 56, which may stack the platforms 12 on top of one another in a vertical configuration 57. The rack 56 may, at least in part, be constructed of metal, plastic, wood, composite material, or a combination thereof, and may provide sufficient space between the platforms 12 for the gantry 20 to travel across each platform 12 while connected to a modular tool 28. In some embodiments, the rack 56 may be constructed from steel.

An elevator 58 adjacent to the width axes 14 of the platforms 12 in the rack 56 may facilitate the travel of the gantry 20 between the platforms 12. The elevator 58 may include an elevator platform 59 which contains an extension of the linear rack gear 98 that extends across the adjacent platform 12 or track 19, and which allows the gantry 20 to move across the platform 12 or track 19 (this elevator platform 59 linear rack gear is not illustrated in FIG. 12). The elevator platform 59 may align itself with a particular platform 12 or track 19 and bring its linear rack gear into alignment with the linear rack gear 98 of the platform 12 or track 19. In this manner, the gantry 20 can drive seamlessly from the edge of the platform 12 or track 19 onto the elevator 58, while connected to a modular tool 28.

The elevator platform 59 may be connected, via a cable 61, to a counterweight 62 by means of a pulley 60. As the elevator platform 59 ascends, the connected counterweight 62 may descend, and vice versa, to reduce the force required to move the elevator platform 59. The elevator platform 59 may be moved up and down via an electric motor connected to the pulley 60, and may be sized to accommodate both the gantry 20 and any modular tool 28 that is currently connected to the gantry 20 at the time it moves onto the elevator 58. However, other elevator 58 embodiments are possible which would nonetheless remain within the scope of this invention.

Similar to its facilitation of the gantry 20 movement and operation, the controller may operate the pulley 60 motor and command the elevator platform 59 to move to different platform 12 levels in the rack 56 while transporting the gantry 20 and connected modular tool 28. Once the elevator platform 59 reaches a new platform 12 level and aligns its surface and linear rack gear with the linear rack gear 98 of the platform 12 or track 19, the controller may engage the gantry 20 to move off of the elevator platform 59 and onto the new platform 12.

The elevator 56 may further include a wireless receiver of the type well-known in the art, which receives instructions from the controller over a local wireless network. Alternatively, the elevator 58 may receive communication signals between the elevator 58 and the controller directly through a physical connection, such as a data cable.

The horticulture apparatus 10 may further include one or more artificial light sources to provide electromagnetic radiation to support the photosynthesis and growth of the plants 38 in the platform 12 substrate 18. In horticulture apparatus 10 embodiments that utilize a rack 56 to support a plurality of platforms 12, multiple artificial light sources may be mounted to the undersides of the platforms 12, so that each platform 12 receives light from the platform 12 above it. In this configuration, a separate artificial light source mount may provide light for the highest platform 12 in the rack 56.

The artificial light source may provide visible light, or may be infrared or ultraviolet in nature. In a preferred embodiment, the artificial light source may include light emitting diode bulbs that emit visible light. The controller may activate and deactivate the artificial light source to simulate a day-night cycle and stimulate the growth of the particular plants 38 being grown.

In a separate embodiment best seen in FIG. 13, the horticulture apparatus 10 may include a plurality of racks 56, each of which contains a plurality of platforms 12 stacked in a vertical configuration 57. In this embodiment, the plurality of racks 56 may together comprise a three-dimensional array 64 of racks 56. This embodiment of the horticulture apparatus 10 may make the greatest possible three-dimensional use of a given floor area in order to grow and harvest plants 38. To improve figure clarity, the individual platforms 12 are not illustrated in FIG. 13.

The horticulture apparatus 10 may permit a single gantry 20 and elevator 58 to access, seed, and harvest all the platforms 12 and racks 56 in the array 64. A horizontal transfer mechanism 65 may facilitate the movement of the gantry 20, and any modular tools 28 connected to the gantry 20, horizontally between separate racks 56 in the array 64. In an embodiment, the horizontal transfer mechanism 65 may include a pair of horizontal rails 66 mounted parallel to the width axes 14 of the platforms 12 at a particular vertical level in the array 64. The horizontal transfer mechanism 65 may further include a horizontal carrier 68, which may travel horizontally along the horizontal rails 66.

Referring now to FIG. 3 and FIG. 13, the horizontal carrier 68 may include a carrier platform 67 connected to one or more wheels 69. The wheels 69 may transmit the weight of the horizontal carrier 68 to the horizontal rails 66. Furthermore, a motive source, such as an electric motor, may connect to the wheels 69, and may permit the horizontal carrier 68 to drive horizontally across the horizontal rails 66. The controller may command the horizontal carrier 68 to move across the horizontal rails 66 and to reach particular locations adjacent to certain platforms 12 in the array 64.

The carrier platform 67 may be sized to receive the gantry 20 and any modular tools 28 connected to the gantry 20. More specifically, the carrier platform 67 may contain an extension of the linear rack gear 98 that extends across the adjacent platform 12 or track 19. The horizontal carrier 68 may facilitate the movement of the gantry 20 onto the carrier platform 67 in the following manner. The horizontal carrier 68 may align itself with a particular platform 12 or track 19 and bring its linear rack gear extension into alignment with the linear rack gear 98 of the platform 12 or track 19. As the gantry 20 moves along the linear rack gear 98 of the adjacent platform 12 or track 19, it may continue moving onto the linear rack gear extension of the carrier platform 67, and thereby transit from the platform 12 or track 19 onto the horizontal carrier 68. This carrier platform 67 linear rack gear extension is not illustrated in FIG. 3 or 13.

Once on the carrier platform 67, the weight of the gantry 20 may be transmitted to the carrier platform 67 by one or more gantry pads 103, 103'. The horizontal carrier 68 may move the gantry 20, and any modular tools 28 connected to the gantry 20, horizontally between separate platforms 12 at the same level in the array 64. Once at and aligned with a new platform 12, the controller may command the gantry 20 to activate its motor 24 and move onto the linear rack gear 98 of the platform 12 or track 19, thereby exiting the carrier platform 67 and beginning to move across the new platform 12.

In a further embodiment, the horizontal transfer mechanism 65 may include a plurality of separate pairs of horizontal rails 66 which may connect each level of the platforms 12 in the racks 56 (e.g., see FIG. 13). Each pair of these rails 66 may further include a horizontal carrier 68 (multiple horizontal carriers 68 not illustrated in FIG. 13), which may travel along these pairs of rails 66 between the platforms 12 at a specific level in the array 64.

Each horizontal carrier 68 may further include a wireless receiver of the type well-known in the art, which receives instructions from the controller over a local wireless network. Alternatively, the horizontal carrier 68 may receive communication signals between the horizontal carrier 68 and the controller directly through the electrical contact points of the horizontal carrier 68 on the horizontal rails 66.

In an embodiment, gantry 20 movement between the various racks 56 of the array 64, and the plurality of platforms 12 supported by each rack 56, is facilitated by a single vertical elevator 58 and multiple horizontal carriers 68 and pairs of horizontal rails 66, with a separate pair of horizontal rails 66, along with an accompanying horizontal carrier 68, at each platform 12 level of the various racks 56. This arrangement is best seen in FIG. 13 (additional horizontal carriers 68 and elevator 58 not illustrated). Alternatively, gantry 20 access could be facilitated by a single pair of horizontal rails 66 and a single horizontal carrier 68, and a plurality of elevators 58, with an elevator 58 adjacent to each rack 56, to enable the vertical travel of the gantry 20.

In an embodiment, the horticulture apparatus 10 may be further configured to provide 'home' locations for the gantry 20 and the various modular tools 28 associated with the horticulture apparatus 10. The controller may move the gantry 20 to its 'home' location, such as waiting on the elevator platform 59, when no work from the gantry 20 is required at a specific time. Similarly, the controller may command the gantry 20 to move one or more modular tools 28 into their own 'home' locations and disconnect from them using the releasable locking mechanism 30, before returning to its own 'home' location.

The foregoing description, for purpose of explanation, has been described with reference to specific embodiments. However, the illustrative discussions above are not intended to be exhaustive or to be limiting with respect to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of" In addition, for ease of use, the words "including" and "having," as used in the specification and claims, are interchangeable with and have the same meaning as the word "comprising." In addition, the term "based on" as used in the specification and the claims is to be construed as meaning "based at least upon." Also, the term "immediately" with respect to a delay of machine action means without delay typically perceivable by human users.

What is claimed is:

1. An apparatus, comprising:
   a platform having a width axis and a length axis;

a gantry sized to straddle and move across at least one of the platform's width and length axes, the gantry comprising:
a frame;
a motor mounted to the frame;
a container bin operatively connected to the frame; and
a modular tool operatively connected to the frame; and
a controller;
wherein said gantry, under the control of said controller, engages said motor to move the gantry across said platform, thereby providing said modular tool with access to different locations of the platform;
wherein said platform provides a substrate suitable in which to plant seeds;
said modular tool comprises a seeding tool; and
said container bin comprises a seeding bin containing seeds;
wherein said gantry, under the control of said controller:
engages said motor to move the gantry across said platform; and
engages said seeding tool to draw seeds from said seeding bin and place the seeds on said substrate.

2. The apparatus of claim 1, wherein said seeding tool comprises a hollow tube connected to said seeding bin by a valve.

3. The apparatus of claim 1, wherein:
said platform provides a substrate in which plants grow;
said modular tool comprises a harvesting tool; and
said container bin comprises a harvesting bin which provides space to collect harvested plants;
wherein said gantry, under the control of said controller, engages said motor to move the gantry across said platform while simultaneously engaging said harvesting tool to collect said plants from the substrate and place the harvested plants in said harvesting bin.

4. The apparatus of claim 3, wherein said harvesting tool comprises a horizontal blade.

5. The apparatus of claim 3, wherein said harvesting tool comprises shears.

6. The apparatus of claim 3, wherein said harvesting tool comprises a lifting mechanism to separate said plants from said substrate.

7. The apparatus of claim 6, wherein said lifting mechanism comprises lifting fingers.

8. The apparatus of claim 3, further comprising a rotating brush operatively connected to the frame of said gantry, said rotating brush positioned to:
gather the harvested plants after said harvesting tool has removed the harvested plants from the substrate; and
sweep said harvested plants into said harvesting bin.

9. The apparatus of claim 3, further comprising:
a platform conveyor mounted to said platform on the axis parallel to the gantry's axis of travel; and
a harvested plant delivery mechanism mounted within said harvesting bin;
wherein said harvested plant delivery mechanism channels the harvested plants towards the conveyor, and said conveyor transports said harvested plants after receiving them from said harvested plant delivery mechanism.

10. The apparatus of claim 9, wherein said harvested plant delivery mechanism comprises a delivery conveyor oriented to transport harvested plants to the platform conveyor.

11. The apparatus of claim 1, further comprising:
a platform rack sized to receive a plurality of platforms arranged in a stacked configuration;
a plurality of platforms mounted to said platform rack; and
a gantry elevator aligned with said platforms and sized to receive said gantry;
wherein said controller:
engages said motor to move the gantry from a first platform onto said gantry elevator;
engages said gantry elevator to move said gantry to align with a second platform; and
engages said motor to move the gantry from the gantry elevator onto the second platform.

12. The apparatus of claim 11, further comprising;
a plurality of platform racks arranged adjacent to one another, wherein a plurality of platforms are mounted to each platform rack; and
a horizontal transfer mechanism aligned with said plurality of platform racks, said horizontal transfer mechanism sized to receive said gantry;
wherein said controller:
engages said motor to move the gantry from a first platform on a first platform rack onto said horizontal transfer mechanism;
engages said horizontal transfer mechanism to move said gantry to align with a second platform on a second platform rack; and
engages said motor to move the gantry from the horizontal transfer mechanism onto the second platform on the second platform rack.

13. The apparatus of claim 12, wherein said horizontal transfer mechanism comprises a gantry carrier mounted to horizontal rails.

14. The apparatus of claim 1, wherein said gantry, under the control of said controller:
disconnects from the modular tool;
connects to a second modular tool; and
engages said motor to move the gantry across said platform while connected to said second modular tool.

15. The apparatus of claim 1, further comprising a light source mounted above and oriented facing said platform.

16. The apparatus of claim 15, wherein said light source comprises light-emitting diodes.

17. The apparatus of claim 1, wherein said platform is oriented in a vertical configuration with its surface perpendicular to that of the ground.

18. An apparatus for planting and harvesting agricultural products, comprising:
a platform rack containing a plurality of platforms arranged in a stacked configuration, each platform having a standardized width axis, length axis, and a substrate suitable for growing product;
a gantry sized to straddle and move across at least one of said platforms' width and length axes, the gantry comprising:
a frame;
a motor mounted to the frame;
a seeding tool mounted to the frame;
a seeding bin mounted to the frame and connected to the seeding tool;
a cutting tool mounted to the frame; and
a transport bin mounted to the frame and oriented with respect to the cutting tool;
a controller; and
a gantry elevator aligned with said platforms and sized to receive said gantry;
wherein said controller at a first time interval:
engages said motor to move the gantry across a first platform while engaging said seeding tool to draw seeds from said seeding bin and to distribute the seeds on the substrate of said first platform;

engages said motor to move said gantry to said gantry elevator;

engages said gantry elevator to move said gantry to align with a second platform;

engages said motor to move the gantry across said second platform while engaging said seeding tool to draw seeds from said seeding bin and to distribute the seeds on the substrate of said second platform; and wherein said controller at a second time interval:

engages said motor to move the gantry across said second platform while engaging said cutting tool to cut plants from said platform substrate and move the cut plants into the transport bin;

engages said motor to move said gantry to said gantry elevator;

engages said gantry elevator to move said gantry to align with said first platform; and engages said motor to move the gantry across the first platform while engaging said cutting tool to cut plants from said platform substrate and move the cut plants into the transport bin.

19. A method of growing and harvesting plants using an automated apparatus comprising a platform, a gantry sized to straddle and move across said platform, and a plant growth sensor, said method comprising:

providing a substrate on said platform suitable for growing a plant product;

connecting said gantry, at a first time interval, to a seeding tool;

moving said gantry across said platform, said seeding tool distributing seeds onto said platform substrate;

releasing said seeding tool from said gantry;

monitoring, with said plant growth sensor, the growth of the plant product;

connecting said gantry, at a second time interval, to a harvesting tool and a harvesting bin; and moving said gantry across said platform, said harvesting tool collecting grown plant product from said platform substrate and placing it in said harvesting bin.

* * * * *